(12) United States Patent
Song et al.

(10) Patent No.: US 7,912,041 B2
(45) Date of Patent: Mar. 22, 2011

(54) METHOD FOR CONTROLLING VCC FUNCTIONS IN VCC INITIATED BY TERMINAL AND TERMINAL AND NETWORK SERVER THEREOF

(75) Inventors: Jae-Seung Song, Seoul (KR);
Kyung-Ae Yoon, Gyeonggi-Do (KR);
Mi-Seon Ra, Seoul (KR); Hyun-Sook Kim, Seoul (KR); Hede Patrice, Enghien-les-bains (FR)

(73) Assignee: LG Electronics Inc., Seoul (KR)

( * ) Notice: Subject to any disclaimer, the term of this patent is extended or adjusted under 35 U.S.C. 154(b) by 954 days.

(21) Appl. No.: 11/702,175

(22) Filed: Feb. 5, 2007

(65) Prior Publication Data
US 2007/0183411 A1 Aug. 9, 2007

Related U.S. Application Data

(60) Provisional application No. 60/765,213, filed on Feb. 6, 2006.

(51) Int. Cl.
*H04L 12/66* (2006.01)
(52) U.S. Cl. .................. 370/352; 370/331; 370/401
(58) Field of Classification Search .................. None
See application file for complete search history.

(56) References Cited

U.S. PATENT DOCUMENTS

| | | | |
|---|---|---|---|
| 6,118,780 A | 9/2000 | Dunn et al. | |
| 7,603,433 B1 * | 10/2009 | Paterik | 709/217 |
| 2005/0202819 A1 | 9/2005 | Blicker | |
| 2005/0259649 A1 * | 11/2005 | Smith | 370/389 |
| 2006/0111135 A1 * | 5/2006 | Gray et al. | 455/519 |
| 2006/0229093 A1 * | 10/2006 | Bhutiani et al. | 455/518 |
| 2007/0135146 A1 * | 6/2007 | Rezaiifar et al. | 455/466 |
| 2007/0149166 A1 * | 6/2007 | Turcotte et al. | 455/404.1 |
| 2007/0238467 A1 * | 10/2007 | Buckley et al. | 455/445 |
| 2007/0238468 A1 * | 10/2007 | Buckley et al. | 455/445 |
| 2008/0318565 A1 * | 12/2008 | Stojanovski et al. | 455/422.1 |
| 2010/0034166 A1 * | 2/2010 | Olvera-Hernandez | 370/331 |

FOREIGN PATENT DOCUMENTS

| | | |
|---|---|---|
| EP | 1 478 112 A2 | 11/2004 |
| WO | WO-01/72024 A1 | 9/2001 |
| WO | WO-03/041356 A1 | 5/2003 |

* cited by examiner

*Primary Examiner* — Phirin Sam
(74) *Attorney, Agent, or Firm* — Birch, Stewart, Kolasch & Birch, LLP

(57) ABSTRACT

A method, terminal and system for controlling VCC functions are discussed. According to an embodiment, the terminal includes a controller to generate a register message including VCC capability information of the terminal, a transmitting unit to transmit the register message including the VCC capability information to the first network server, and a receiving unit to receive a response message to the register message from the first network server, the response message selectively including the VCC capability information.

10 Claims, 13 Drawing Sheets

FIG. 4

REGISTER sip:registrar.home1.net SIP/2.0
Via: SIP/2.0/UDP
[5555::aaa:bbb:ccc:ddd];comp=sigcomp;branch=z9hG4bKnashds7
Max-Forwards: 70
P-Access-Network-Info: 3GPP-UTRAN-TDD; utran-cell-id-3gpp=234151D0FCE11
From: <sip:user1_public1@home1.net>;tag=4fa3
To: <sip:user1_public1@home1.net>
Contact: <sip:[5555::aaa:bbb:ccc:ddd];comp=sigcomp>;expires=600000
Call-ID: apb03a0s09dkjdfglkj49111
Authorization: Digest username="user1_private@home1.net", realm="registrar.home1.net", nonce="", uri="sip:registrar.home1.net", response=""
Security-Client: ipsec-3gpp; alg=hmac-sha-1-96; spi-c=23456789; spi-s=12345678; port-c=2468; port-s=1357
Require: sec-agree
Proxy-Require: sec-agree
CSeq: 1 REGISTER
VCC Capability = 1
Supported: path
Content-Length: 0

FIG. 6

PUT http://xcap.home1.net/services/resource-lists/users/user1/pf.xml HTTP/1.1

User-Agent: IMS subscriber

Date: Thu, 08 Jan 2004 10:13:17 GMT

Content-Type: application/resource-lists+xml

Content-Length: (...)

<?xml version="1.0" encoding="UTF-8"?>
   <resource-lists xmlns="urn:ietf:params:xml:ns:resource-lists">
        xmlns:xsi="http://www.w3.org/2001/XMLSchema-instance"
        xsi:schemaLocation="urn:ietf:params:xml:ns:resource-lists">
            <msg name="VCC Enabling">
            <msg-value>0 (Disable) </msg-value>
            </msg>
</resource-lists>

FIG. 7

PUT http://xcap.home1.net/services/resource-lists/users/user1/pf.xml HTTP/1.1

User-Agent: IMS subscriber

Date: Thu, 08 Jan 2004 10:13:17 GMT

Content-Type: application/resource-lists+xml

Content-Length: (...)

<?xml version="1.0" encoding="UTF-8"?>
   <resource-lists xmlns="urn:ietf:params:xml:ns:resource-lists">
        xmlns:xsi="http://www.w3.org/2001/XMLSchema-instance"
        xsi:schemaLocation="urn:ietf:params:xml:ns:resource-lists">
            <msg name="VCC Enabling">
            <msg-value>1 (Enable) </msg-value>
            </msg>
</resource-lists>

FIG. 9

REGISTER sip:registrar.home1.net SIP/2.0
Via: SIP/2.0/UDP
[5555::aaa:bbb:ccc:ddd];comp=sigcomp;branch=z9hG4bKnashds7
Max-Forwards: 70
P-Access-Network-Info: 3GPP-UTRAN-TDD; utran-cell-id-
3gpp=234151D0FCE11
From: <sip:user1_public1@home1.net>;tag=4fa3
To: <sip:user1_public1@home1.net>
Contact: <sip:[5555::aaa:bbb:ccc:ddd];comp=sigcomp>;expires=600000
Call-ID: apb03a0s09dkjdfglkj49111
Authorization: Digest username="user1_private@home1.net",
realm="registrar.home1.net", nonce="", uri="sip:registrar.home1.net",
response=""
Security-Client: ipsec-3gpp; alg=hmac-sha-1-96; spi-c=23456789; spi-
s=12345678; port-c=2468; port-s=1357
Require: sec-agree
Proxy-Require: sec-agree
CSeq: 1 REGISTER
VCC Capability = 1
Supported: path
Content-Length: 0

UE : VCC non-capable UE

FIG. 11

GET http://vcc.example.com/ HTTP/1.1
Host: vcc.example.com:9999
User-Agent: VCC subscriber
Date: Thu, 08 Jan 2004 10:43:17 GMT
Accept: VCC Capability
Content-Length: 0

FIG. 12

```
HTTP/1.1 200 OK
Server: Apache/1.3.22 (Unix) mod_perl/1.27
Date: Thu, 08 Jan 2004 11:00:47 GMT
Content-Type: VCC Capability
Content-Length: (...)

<?xml version="1.0" encoding="UTF-8"?>
            <resource-lists xmlns="urn:ietf:params:xml:ns:resource-lists">
      xmlns:xsi="http://www.w3.org/2001/XMLSchema-instance"
      xsi:schemaLocation="urn:ietf:params:xml:ns:resource-lists">
            <msg name="VCC Capability">
                        <msg-value>0 (Not Capable)</msg-value>
                  </msg>

</resource-lists>
```

METHOD FOR CONTROLLING VCC FUNCTIONS IN VCC INITIATED BY TERMINAL AND TERMINAL AND NETWORK SERVER THEREOF

The present application claims the priority benefits of U.S. Provisional Application No. 60/765,213 filed on Feb. 6, 2006 and Korean Patent Application No. 10-2007-0003497 filed on Jan. 11, 2007 in Republic of Korea. The entire contents of these applications are herein fully incorporated by reference.

BACKGROUND OF THE INVENTION

1. Field of the Invention

The present invention relates to a method for controlling Voice Call Continuity (VCC) related functions in a VCC operation initiated by a terminal by employing VCC capability information and/or VCC enabling information. The invention also relates to the terminal and network server for implementing the method.

2. Description of the Background Art

In general, a Voice Call Continuity (VCC) refers to a service for allowing a call path exchange of voice calls between a 3GPP Circuit Switching (CS) system (e.g., GSM, UMTS, etc.) and an IP Multimedia Subsystem (IMS). That is, the VCC refers to a type of application, namely, a home IMS application which is capable of transporting voice calls between the CS domain and the IMS domain. As such, the VCC provides functions of voice call originations, voice call terminations and a domain transfer from the CS domain to the IMS domain or vice versa. Here, the domain transfer refers to transferring access legs for voice calls toward a User Equipment (UE) (i.e., a terminal) from the CS domain to the IMS domain or vice versa during an active session. The access leg denotes a call control leg between a VCC UE and a Domain Transfer Function (DTF) of the VCC application (server).

Through the domain transfer procedures of the VCC service, continuity for one or more voice sessions is provided between the IMS domain and CS domain while the VCC UE performs the one or more voice sessions. That is, the VCC services provides continuity to the voice call by switching from the IMS domain to the CS domain or vice versa, e.g., when the current domain for the call is not suitable or desired.

According to the VCC service, generally the domain transfer for a certain voice call/session from the CS domain to the IMS domain or vice versa is initiated only when a DTF is positioned (located) on a signal path of the voice call/session setup. For this, positioning of the DTF on the way of the signal path of the voice call/session setup is referred to as anchoring in IMS or anchoring.

FIG. 1 illustrates an architecture of a network for providing a VCC service.

As illustrated in FIG. 1, a VCC UE 10 denotes all types of terminals which can support the VCC service. The VCC UE can access the CS and PS (packet switched) domains. That is, when accessing the CS domain, the VCC UE uses a UE-CS (not shown) provided therein, whereas the VCC UE uses a UE-IMS (not shown) provided therein when accessing the PS domain.

A VCC application 30 is an application server (network server) for providing the VCC service, and is constituted with entities which perform a series of functions. For instance, the series of functions may include functions required to setup voice calls toward the VCC UE, and functions required to switch an access leg of the VCC UE between the CS domain and the IMS domain with maintaining (performing) an active session. Here, the series of functions can be a Domain Transfer Function 30a, a Domain Selection Function (30d), a CS Adaptation Function 30b, and a CAMEL Service Application 30c. Detailed capabilities and operations for the series of functions are described in 3GPP TS 23.206 V1.2.0.

Generally, the CS domain entities include a Visited Mobile Switching Center (VMSC), a Gateway MSC (GMSC), a gsm-SCF, and the like. The IMS domain entities include a P-CSCF (Proxy Call Session Control Function) 12, a S-CSCF (Serving Call Session Control Function) 20, a I-CSCF (Interrogating Call Session Control Function) 14, a Media Gateway Control Function (MGCF) 16, and a Home Subscriber Server (HSS) 40.

In order for the VCC UE to receive the VCC services, a registration procedure to the CS and IMS domains must previously be performed. According to the related art VCC technology, the CS registration and IMS registration which are associated with the VCC are as follows.

Specifically, a registration (or an attachment) to the CS domain is performed as the same as an existing registration to the CS domain. The registration to the IMS domain can be performed by the VCC UE only when an IP connectivity is available. The successive registration procedures are performed depending on a subscriber's iFC (initial Filter Criteria). The iFC refers to filter criteria which are a type of user information stored in the HSS. For a VCC subscriber, a third party registration is may occur at the VCC Application Server (VCC AS) 30 depending on the iFC.

FIG. 2 is a signal flowchart illustrating a procedure where a VCC UE registers in an IMS domain according to the background art.

As illustrated in FIG. 2, a VCC UE 10 sends a REGISTER message to a S-CSCF 20 to initiate (start) a registration procedure for a VCC service (S21).

Then the S-CSCF 20 sends information related to a user of the VCC UE 10 to a HSS 40, thereby requesting subscriber information (represented as 'Cx-Put/Cx-Pull' in FIG. 2) (S22). The S-CSCF 20 then receives the subscriber information from the HSS 40 (indicated as 'Cx-Put/Cx-Pull Resp' in FIG. 2) (S23). The S-CSCF 20 then performs a service logic based upon the iFC included in the received subscriber information and determines if the VCC UE 10 should be registered (S24). If the determination indicates that the registration is allowed (e.g., because the user of the UE 10 is a VCC service subscriber), the S-CSCF 20 performs a third party registration procedure with the VCC AS 30 so as to register the VCC UE 10 at the VCC AS 30 (S25). The VCC AS 30 delivers a 200 OK message to the VCC UE 10 via the S-CSCF 20 after the third party registration procedure is successfully performed (S26 and S27). On the other hand, if the determination at step S24 indicates that the registration is not allowed, then the third party registration procedure is not performed.

Once the VCC UE 10 completes the registration for the VCC service through steps S21 to S27, the network may adapt the following logic for calls associated with the VCC subscriber (i.e., the user of the VCC UE 10).

1) Call origination: when the corresponding VCC subscriber originates a call (i.e., when the call is an outgoing call), an anchoring in the IMS domain is performed for the VCC.
2) Call termination: when a network receives a call which the corresponding VCC subscriber terminates (i.e., when the call is an incoming call directed to the terminal), an anchoring in the IMS domain is performed for the VCC. The CS domain or IMS domain is selected (i.e., a domain selection is performed) and the call is terminated in the selected domain.

3) Domain selection: the corresponding VCC subscriber (i.e., the VCC UE user) selects a currently activated domain or the most suitable domain based upon operator policy.

4) Domain transfer: domain transfer for an ongoing call is initiated from a first domain to a second domain.

In the VCC service according to the background art, the network manages the VCC service subscription information of the users, but the network does not and can not know whether a terminal communicating with the network server is a VCC capable UE or not. Such technical limitation causes a waste of resources due to unnecessarily initiating or attempting to perform VCC related operations between the terminal and the network even though the terminal does not have the VCC capability.

In particular, in a first case where the terminal user has a VCC subscription and the terminal is a VCC non-capable terminal (i.e., terminal does not have the VCC capability), and in a second case where the terminal user has no VCC subscription and the terminal used by the user is a VCC capable terminal (i.e., terminal has the VCC capability), the waste of resources may be caused in the VCC service system according to the background art by initiating or performing the VCC-related operations.

For example, in the first case according to the background art, when the terminal user has the VCC subscription but uses a terminal which can not support the VCC (i.e., VCC non-capable UE), the network still performs or initiates the VCC-related operations (or functions) in communication with the corresponding terminal, which results in a consumption of resources since the terminal cannot support the VCC-related operations. Also, to perform the needless VCC-related operations according to the background art, extra signaling and radio resources are used for no reason, the terminal's battery life is shortened, and the terminal's CPU power is also degraded.

Furthermore, even if the user has the VCC subscription and uses the VCC capable terminal (UE), after registering to the network, the VCC function of the VCC capable terminal can be enabled or disabled, depending on the user's various circumstances (e.g., user's preferences) and communication conditions. For example, if the VCC function at the terminal is set as enabled, the domain transfer for an ongoing call (i.e., incoming call or outgoing call) may be performed. However, in this case, if the terminal is currently located (positioned) in the overlapped coverage area between the CS and a IP-CAN (IP-Capable Access Network), unnecessary domain transfers may frequently occur or a communication inconsistency can severely occur during the domain transfer performed. In this case, in order to address this problem, the user may desire to disable the VCC capability of his terminal temporarily. As such, there is a need for a technique of changing (controlling), depending on the user's preferences, the VCC function from being enabled to being disabled or vice versa under the control of the terminal, and communicating this changed information to the VCC application so that the VCC application does not waste resources in initiating unnecessary VCC operations.

SUMMARY OF THE INVENTION

Therefore, it is an object of the present invention to control VCC functions performed between a terminal (i.e., UE) and a network server to be enabled or disabled under the control of the terminal by sending information regarding the VCC functions to the network server when the terminal registers in the network server.

It is another object of the present invention to control VCC functions performed between a terminal and a network server such that the VCC functions can be enabled or disabled by sending information regarding the VCC enabling/disabling information to the network server after or before the terminal registers in the network server.

It is still another object of the present invention to control a network server to query a terminal (i.e., UE) as to enabling or disabling of VCC functions in cases where the network server has not received information regarding the VCC functions from the terminal at the time when the terminal registers in the network server.

It is still another object of the present invention to provide a method, terminal and system for controlling VCC operations by providing VCC function status information (e.g., VCC capability information, VCC enabling information, etc.) to a network server, which address the limitations and disadvantages associated with the background art.

To achieve these and other objects, there is provided according to an aspect of the present invention a method for controlling a voice call continuity (VCC) function of a terminal, comprising: transmitting a register message including VCC capability information of the terminal from the terminal to a first network server; obtaining, by the first network server, subscriber information associated with the terminal; determining, by the first network server, whether or not a user of the terminal is a VCC subscriber based on the obtained subscriber information; selectively transmitting, by the first network server, the register message including the VCC capability information to a second network server based on the determination result; and performing, by the second network server, a VCC function control for the terminal based on the VCC capability information if the determining step indicates that the user is a VCC subscriber.

According to another aspect, the present invention provides a method for controlling a voice call continuity (VCC) function of a terminal, comprising: receiving, by a first network server, a register message from the terminal during a registration operation of the terminal; obtaining, by the first network server, subscriber information associated with the terminal; determining, by the first network server, whether or not a user of the terminal is a VCC subscriber based on the obtained subscriber information; transmitting, by the first network server, the register message if the determining step indicates that the user is a VCC subscriber; determining, by the second network server, whether or not VCC capability information is present in the register message; and transmitting, by the second network server, a query message to the terminal to determine whether or not the terminal is a VCC capable terminal, if the determining step indicates that the VCC capability information is not present in the register message.

According to another aspect, the present invention provides a terminal for controlling a voice call continuity (VCC) function, comprising: a controller to generate a register message including VCC capability information of the terminal; a transmitting unit to transmit the register message including the VCC capability information to the first network server; and a receiving unit to receive a response message to the register message from the first network server, the response message selectively including the VCC capability information.

According to another aspect, the present invention provides a system for controlling a voice call continuity (VCC) function of a terminal, comprising: a terminal to transmit a register message to a first network server; the first network server to receive the register message, to obtain subscriber information associated with the terminal, to determine whether or not a user of the terminal is a VCC subscriber based on the obtained subscriber information, and to transmit the register message to a second network server if the user is a VCC subscriber; and the second network server to determine whether or not VCC capability information is present in the register message, and to transmit a query message to the terminal to determine whether or not the terminal is a VCC capable terminal if the VCC capability information is not present in the register message.

According to another aspect, the present invention provides a method for communicating status information with a network for use in a voice call continuity (VCC) system, the VCC system including a user equipment (UE) and a VCC network server, the method comprising: determining, by the UE, current status information associated with a VCC function of the UE; generating, by the UE, VCC function status information of the UE according to the determination result; transmitting, by the UE, the generated VCC function status information to the VCC network server.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 illustrates one example of a REGISTER message of FIG. 3 in a XML format having a 'VCC Capability' parameter with a value set to '1' according to the present invention.

FIG. 6 illustrates one example of a HPPT PUT message of FIG. 5 in a XML format which includes a 'VCC Enabling' feature tag set to '0' according to the present invention.

FIG. 7 illustrates one example of a HPPT PUT message of FIG. 5 in a XML format which includes the 'VCC Enabling' feature tag set to '1' according to the present invention.

FIG. 9 illustrates an example of the REGISTER message of FIG. 8 in a XML format having a 'VCC Capability' parameter with a value set to 1 according to the present invention.

FIG. 11 illustrates one example of a HPPT GET message of FIG. 10 in a XML format including 'VCC Capability' according to the present invention.

FIG. 12 illustrates one example of a HPPT 200 OK message of FIG. 10 in a XML format including 'VCC Capability' according to the present invention.

DETAILED DESCRIPTION OF THE PREFERRED EMBODIMENTS

Figure 1:
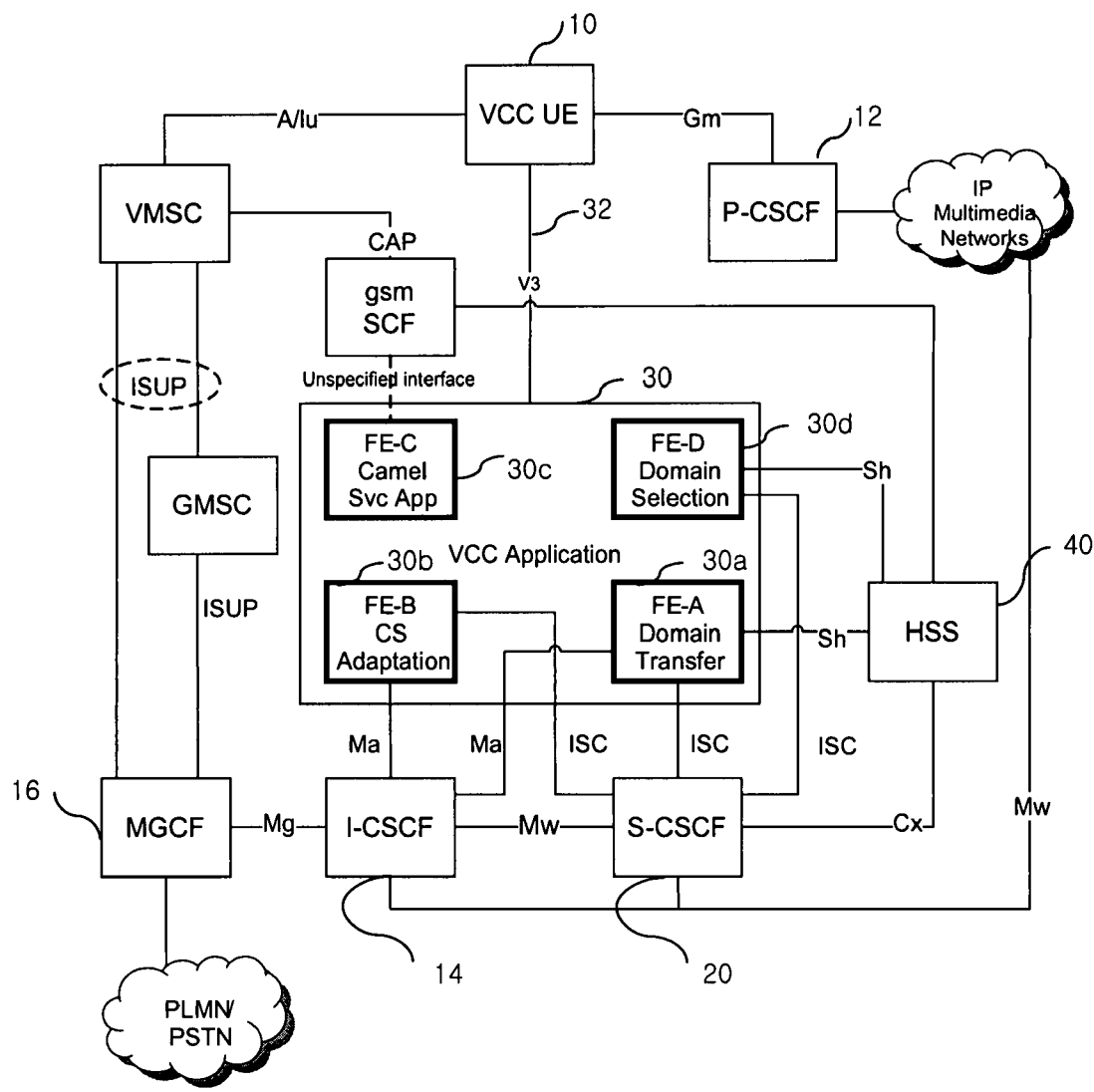
FIG. 1 is a network architecture for providing a VCC service, in which the present invention can be implemented.
Figure 2:
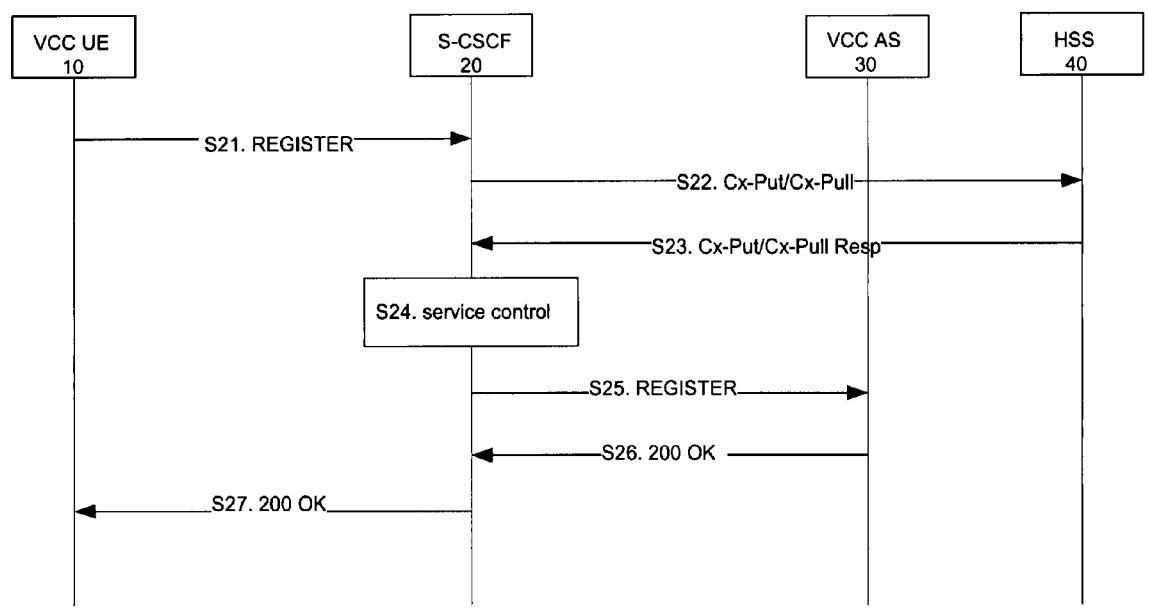
FIG. 2 is a signal flowchart illustrating a procedure where a VCC UE registers in an IMS domain according to a background art.

The present invention is applicable to a Voice Call Continuity (VCC) field of 3GPP, and it may also be applicable to other communication fields.

Substantially in the present invention, a UE (terminal) sends information related to VCC functions to a network server (e.g., a VCC AS (VCC Application Server)) to thusly control the network server not to unnecessarily perform VCC related functions (e.g., domain selection or domain transfer), thereby preventing a waste of resources. The information related to the VCC functions can also be referred to as 'VCC function status information', and can include VCC capability information indicating whether or not the UE has the VCC capability, and/or VCC enabling information indicating whether the VCC capability has been enabled or disabled. In other words, in the present invention, the UE sends the VCC capability information and/or the VCC enabling information to the network server to effectively control whether or not VCC related functions (e.g., domain selection, domain transfer, etc.) are performed, thereby preventing the waste of resources often caused by unnecessarily performing the useless VCC related functions.

Hereinafter, terms used in the description of the preferred embodiments of the present invention will now be defined.

A UE according to the present invention may include all types of terminals which can employ (or support) the VCC services (i.e., VCC capable UEs). For instance, the UE according to the present invention comprehensively includes mobile communications terminals (e.g., UEs, mobile phones, cellular phones, DMB phones, DVB-H phones, PDAs, PTT, etc.) capable of employing (or supporting) VCC services, digital TV sets, GPS navigation devices, portable game machines, MP3, other home appliances, and the like. The present invention is described by using the term 'UE' which indicates a terminal. Also, in the present invention, a terminal which is capable of supporting (employing) the VCC (i.e., terminal has the VCC capability) is called a 'VCC UE' and a terminal which is not capable of supporting the VCC (i.e., terminal does not have the VCC capability) is called a 'VCC non-capable UE'.

The 'VCC capability information' denotes information indicating whether the UE is a VCC capable UE (i.e., a VCC UE). The 'VCC enabling information' denotes information indicating whether the VCC functions are enabled or disabled in case the UE is a VCC capable UE.

The VCC capability information and/or the VCC enabling information may, for example, be implemented as a specific indicator (or indication). For instance, the VCC capability information can be represented with a parameter or flag 'VCC Capability', and the VCC enabling information may be represented with a parameter or flag 'VCC Enabling'. Also, this information may be included (or inserted or embedded) in a certain message (e.g., a SIP-based REGISTER message or a SIP-based INVITE message). A value of the parameter or indicator 'VCC Capability' and a value of the parameter or indicator 'VCC Enabling' may be set to '0' or '1'. In other words, the parameter 'VCC Capability' and/or 'VCC Enabling' can be a 1-bit parameter, which is included (or inserted or embedded), as a feature tag, in a header or body of a certain message (e.g., a SIP-based REGISTER message or a SIP-based INVITE message), thereby being sent from the UE to the network server. However, these parameters can be x-bit parameters where x is equal to or greater than 2. Also, the VCC capability information and the VCC enabling information can be represented using other values or techniques.

As an example only, if a certain message (e.g., a SIP-based REGISTER message or a SIP-based INVITE message) sent from the UE to the network server includes the parameter 'VCC Capability' and the value of that parameter is '1', it can mean that the UE is a VCC capable terminal. If the value of the parameter 'VCC Capability' is set to '0', it can mean that the UE is not a VCC capable terminal. Also, if the value of the parameter 'VCC Enabling' is set to '0', it can mean the VCC UE is forced to disable the VCC function (i.e., its VCC function is disabled), and if the value of the parameter 'VCC Enabling' is set to '1', it can mean the VCC UE enables the VCC function (i.e., its VCC function is enabled).

A technical term 'iFC' (initial Filter Criteria) used in the present invention refers to filter criteria which are a type of user information initially stored in a Home Subscriber Server (HSS). The iFC is generally downloaded into the S-CSCF when the user performs a registration procedure. The iFC may include information related to VCC service subscription of the user. The iFC may be included in VCC subscription information transmitted from the HSS to the S-CSCF.

Another technical term called a 'V3' interface used in the present invention denotes an interface for a mutual information transfer between the terminal (i.e., UE) and the VCC AS. The V3 interface is indicated as 32 in FIG. 1. The V3 interface may be include a Ut interface and an OMA DM (device management). That is, an information transfer from the UE to the VCC AS can be achieved by use of the Ut interface, whereas an information transfer from the VCC AS to the UE can be achieved by use of the OMA DM using a DM technique. A protocol of the V3 interface may exemplarily be a HTTP, which has a XML format. The HTTP defines messages such as PUT, GET, DELETE, and the like.

Hereinafter, construction and operations of the preferred embodiments of the present invention will be explained in detail with reference to the accompanying drawings.

Figure 3:
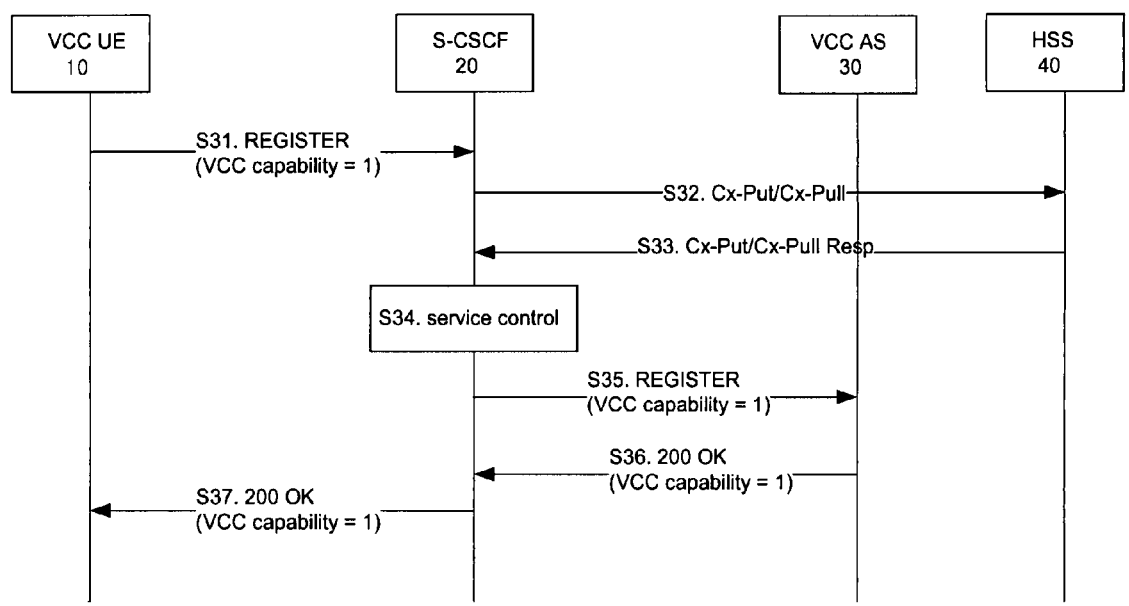
FIG. 3 is a flowchart illustrating a procedure in which a terminal registers in a network server with VCC capability information in a case where the terminal is a VCC UE and the terminal user has a VCC subscription, according to an embodiment of the present invention.

FIG. 3 is a flowchart illustrating an example of a procedure in which a terminal registers in a network server (represented as 'VCC AS' in the drawing) with VCC capability information of the terminal according to an embodiment of the present invention. The method of FIG. 3 as well as the methods in FIGS. 5-12 can be implemented in the network architecture of FIG. 1 or in other suitable system.

Referring to FIG. 3, in this example, it is assumed that the UE 10 is a terminal capable of employing VCC functions (i.e., VCC UE), and the user of the UE 10 has a VCC service subscription (i.e., the user is the VCC service subscriber). Therefore, when initiating a registration such as an IMS registration, the UE 10 sets a value of the parameter 'VCC Capability' to '1' indicating that the terminal has the VCC capability, and sends the set 'VCC Capability' parameter to the S-CSCF 20 by including (or inserting) it in a header or body of a SIP-based REGISTER message (S31). FIG. 4 illustrates one example of such a SIP-based REGISTER message in which the 'VCC Capability' parameter is represented as a feature tag, namely, the 'VCC Capability' feature tag is set to '1' and inserted in the body of the SIP REGISTER message.

After receiving the REGISTER message, the S-CSCF 20 checks whether the user (of the UE 10) has subscribed to the VCC service through the Home Subscriber Service (HSS) 40 using information related to the user of the VCC UE 10. That is, the S-CSCF 20 sends a subscriber information request message (represented as 'Cx-Put/Cx-Pull' in FIG. 3) to the HSS 40 (S32). Here, the subscriber information request message may include the information related to the user of the VCC UE 10.

In response to the subscriber information request message, the HSS 40 then sends a User Profile to the S-CSCF 20 through a subscriber information response message (represented as 'Cx-Put/Cx-Pull Resp' in FIG. 3) (S33). Here, the User Profile may include an iFC which contains VCC service subscription information of the user of the VCC UE 10.

The S-CSCF 20 checks, through steps S32 and S33, that the user of the VCC UE 10 has the VCC subscription. The S-CSCF 20 stores the User Profile (subscription information) received from the HSS 40 in a certain memory (e.g., equipped in itself). The S-CSCF 20 then performs a service logic in order to execute a so-called 'third party registration' process for the VCC service between the VCC UE 10 and the VCC AS 30 depending on the iFC (S34). The iFC can be included in the subscription information (User Profile) received from the HSS 40. Here, because the user of the VCC UE 10 has the VCC subscription, the iFC may include information indicating that the user has the VCC subscription and accordingly a registration session should be sent to the VCC AS 30.

The S-CSCF 20 performs the third party registration procedure with the VCC AS 30 depending on the iFC included in the User Profile (S35 and S36). For instance, if the S-CSCF 20 determines that the registration is allowed because the filter criteria (iFC) have been satisfied (e.g., the user has a proper VCC subscription), the S-CSCF 20 sends a SIP-based REGISTER message to the VCC AS 30 (S35). Also, the iFC includes the address of the VCC-AS 30, which allows the S-CSCF 20 to communicate with the VCC AS 30. In step S35, the REGISTER message includes the parameter 'VCC Capability' having a value set to '1'. For instance, the S-CSCF 20 may merely transmit the REGISTER message received from the UE 10 to the VCC AS 30, or may generate a new REGISTER message including the 'VCC Capability' parameter and send it to the VCC AS 30. If at step S34 the S-CSCF 20 determines that the registration is not allowed, then the S-CSCF 20 may not send the REGISTER message to the VCC-AS 30 and may send a message to the UE 10 indicating that the VCC service registration is not allowed or has failed.

After receiving the REGISTER message from the S-CSCF 20 at step S35, the VCC AS 30 checks (or analyzes) the 'VCC Capability' parameter in the REGISTER message. For example, the VCC AS 30 checks that the 'VCC Capability' feature tag is set to '1' in the REGISTER message as shown in FIG. 4, and then sends a response message (e.g., 200 OK) to the S-CSCF 20 in response to the REGISTER message (S36). The response message may indicate that the IMS registration has been completed. Here, in step S36, the response message (i.e., 200 OK) may include the 'VCC Capability' parameter having the value set to '1'.

On the other hand, once the VCC AS 30 receives the 'VCC Capability' parameter, the VCC AS 30 updates the corresponding information of the user of the VCC UE 10 in a list of VCC active users separately stored and managed by its internal specific unit (portion or member). For instance, if the parameter 'VCC Capability' is set to '0' indicating that the UE is not a VCC capable terminal, then the VCC AS 30 may remove the user of that UE from its list of VCC active users stored therein, or may update the VCC active user information to indicate that the particular UE of that user is not VCC capable. Then, when placing an incoming call (i.e., a terminating call from the network to the terminal) or an outgoing call (i.e., an originating call from the terminal to the network), since the VCC AS 30 inquires (examines) the list of VCC active users thus to identify that the user of the VCC UE 10 is one of the VCC active users in the list (or the UE 10 is VCC capable), VCC related functions (operations) such as a domain transfer, a domain selection, an exchange of user preferences and operator policies, and the like can be performed for the VCC UE 10. That is, based on the VCC capability information (VCC Capability) received from the UE 10, the VCC AS 30 can decide whether or not to perform VCC related operations. This allows the VCC relation operations to be initiated only when the UE is a VCC capable terminal and the user of the UE is a proper VCC subscriber.

Upon completely performing the 'third party registration' process (i.e., S35 and S36), the S-CSCF 20 sends a response message (e.g., 200 OK) to the VCC UE 10 in response to the REGISTER message of step S31 (S37). This response message (i.e., 200 OK) may include the same 'VCC Capability' parameter (value=1) or another designated parameter, which would indicate to the UE 10 that the third party registration procedure for the VCC has successfully been performed. That is, after receiving the response message (i.e., 200 OK), the VCC UE 10 checks the 'VCC Capability' parameter having the feature tag set to '1' from the response message (i.e., 200 OK), thereby recognizing the successful completion of the VCC registration procedure. The network (i.e., VCC AS 30) also checks the REGISTER message received from the S-CSCF 20, determine that the UE 10 is a VCC capable UE by examining the value of the 'VCC Capability' parameter, and therefore can effectively perform, with respect to the VCC UE 10, VCC related functions (e.g., monitoring a radio access for a domain transfer, performing a domain selection or domain transfer for an outgoing call, exchanging user preferences, or the like). If the VCC AS 30 determines that the UE 10 is not a VCC capable UE (e.g., 'VCC Capability=0'), then the VCC AS 30 may not perform the VCC related functions. Accordingly, the present invention allows VCC related functions to be performed or initiated with the terminal, only when the terminal is able to perform/support the VCC related functions (and the user has the VCC subscription), and thus prevents any waste of resources.

According to an embodiment of the present invention, there can be a case where even if a user (i.e., a user having a VCC subscription) is able to use a VCC capable terminal (i.e., VCC UE), the user desires to temporarily disable the VCC function of the terminal according to the user's preferences (or communication conditions toward the terminal). An example therefor is shown as follows. Communication connectivity may be unstable in an IP-CAN so that the user uses a Wireless Local Area Network (WLAN). Simultaneously, useless domain transfers may frequently occur, whereby seamless continuity can not be assured. Therefore, there may occur a case where the user temporarily disables the VCC function of the user's UE, expecting to perform voice communication only over the CS Domain or IMS domain. In such cases, according to the present invention, the UE transmits VCC enabling information indicating if the VCC function of the UE has been enabled or disabled (not enabled), to the VCC AS. For instance, the user of the VCC UE 10 takes into account his preferences or current communication conditions (e.g., a situation where performing the VCC may result in voice call inconsistency), thus to set a configuration of the VCC function of the UE 10 to disable the VCC function. The user may set the VCC function of the UE to be enabled or disabled by use of a specific menu which is provided by a particular module of the VCC UE (10) for setting the configuration of the VCC function. Here, the particular module may be software or hardware, for example. The 'VCC Enabling' parameter then can reflect the set enabling or disabling status of the UE. For instance, 'VCC Enabling=1' if the VCC function of the UE is set to be enabled, and 'VCC Enabling=0' if the VCC function of the UE is set to be disabled.

Once the 'VCC Enabling' parameter is set (or reset), the UE transmits the 'VCC Enabling' parameter to a VCC AS, which will be described below referring to FIG. 5.

Figure 5:
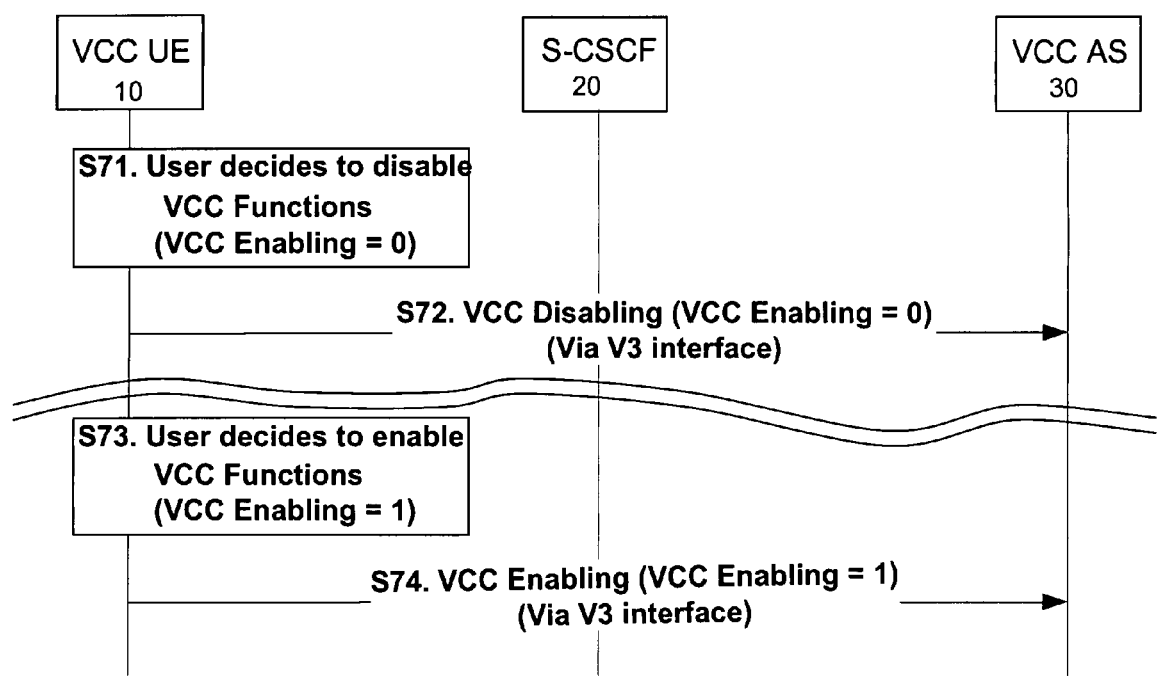
FIG. 5 is a flowchart illustrating a procedure in which a terminal sets or resets a VCC function to be enabled or disabled and notifies the set/reset information to a VCC AS according to an embodiment of the present invention.

FIG. 5 is a flowchart illustrating a procedure in which a terminal sets or resets its VCC function to be enabled or disabled and notifies the set/reset information to a VCC AS before, during or after performing a registration procedure with the VCC AS. In the example of FIG. 5, it is assumed that the UE 10 is a VCC capable terminal and the user of the UE 10 has a (proper) VCC subscription.

As shown in FIG. 5, the VCC UE 10 sends a specific message (e.g., HTTP PUT message) directly to the VCC AS 30 through the V3 interface when or after the VCC UE 10 changes the status of its VCC function from being enabled to being disabled or vice versa. The example of FIG. 5 can be applied to a case where the user of the VC UE 10 takes into account his preferences or communication conditions of the terminal to change or set the VCC function of the UE 10 to be enabled or disabled. The steps of FIG. 5 are now discussed below as being performed after the registration of the UE 10 has been performed successfully with the VCC AS 30. However, this discussion is provided only as an example, and the steps of FIG. 5 are equally applicable to be performed at any time, e.g., before or during the registration of the UE 10.

According to one example, in FIG. 5, steps S71 and S72 are for disabling the VCC function by the VCC UE 10 after the registration procedure with the VCC AS 30 has been performed through which the VCC function of the VCC UE 10 has already been enabled. Similarly, steps S73 and S74 are for enabling the VCC function by the VCC UE 10 after the registration procedure with the VCC AS 30 has been performed through which the VCC function of the VCC UE 10 has already been disabled.

Now steps S71 and S72 of FIG. 5 are explained. If the user of the VCC UE 10 determines to temporarily change the VCC function from being enabled to being disabled (S71), the VCC UE 10 sends a specific message (represented as 'VCC Disabling' message in FIG. 5) via the V3 interface (S72). Here, the specific message, for example, may be a HTTP PUT message as shown in FIG. 6, and include a 'VCC Enabling' message tag where the value of the 'VCC Enabling' parameter is set to '0' so as to indicate that the VCC function of the UE 10 is currently disabled. As a variation, the specific message may be the 'VCC Enabling' parameter along, with its value indicating that the VCC function of the UE 10 is disabled.

Now steps S73 and S74 of FIG. 5 are explained. If the user of the VCC UE 10 determines to temporarily change the VCC function from being disabled to being enabled (S73), the VCC UE 10 sends a specific message (represented as 'VCC Enabling' message in FIG. 5) via the V3 interface (S74). Here, the specific message, for example, may be a HTTP PUT message as shown in FIG. 7, and include a 'VCC Enabling' message tag where the value of the 'VCC Enabling' parameter is set to '1' so as to indicate that the VCC function of the UE 10 is currently enabled. As a variation, the specific message may be the 'VCC Enabling' parameter along, with its value indicating that the VCC function of the UE 10 is enabled.

In another method, the 'VCC Enabling' parameter may be included in a body or header of a HTTP PUT message. The VCC UE can thusly send the HTTP PUT message to the VCC AS 30.

Through steps S72 and S74, when the VCC AS 30 receives a message notifying the change in the VCC function (i.e., the change from being enabled to disabled or vice versa) or indicating if the VCC function of the UE is currently disabled or enabled, the VCC AS 30 may or may not perform the VCC related operations for the VCC UE 10 based upon the received message. For instance, if the 'VCC Enabling' parameter indicates that the VCC function is enabled, then the VCC related operations may be performed with the UE, whereas if the 'VCC Enabling' parameter indicates that the VCC function is disabled, then the VCC related operations may not be performed with the UE.

Also, once the VCC AS 30 receives the 'VCC Enabling' parameter or the like, the VCC AS 30 may update its active VCC user list. For instance, if the VCC enabling information (e.g., 'VCC Enabling' parameter) indicates that the VCC function is disabled, the VCC AS 30 may remove the user of the UE 10 from its active VCC user list, or may indicate that the UE's VCC function has been disabled. Alternatively, the VCC AS 30 may provide and update a VCC enabling list which may be managed by its internal particular module, according to the VCC enabling information. Accordingly, the VCC AS 30 may not perform a domain selection function (or other VCC operation) based on the VCC enabling information in spite of receiving an incoming call toward the VCC UE 10 from the exterior. Also, the VCC AS 30 may not perform a domain transfer for an ongoing call (i.e., outgoing call or incoming call) with the VCC UE 10 based on the VCC enabling information.

Also, the steps of FIG. 5 may be combined or apply in the method of FIG. 3. For instance, after the registration is completed in FIG. 3, when the user disables the VCC function of the UE 10, then steps S71 and S72 of FIG. 5 may be performed. Other variations are possible.

Figure 8:
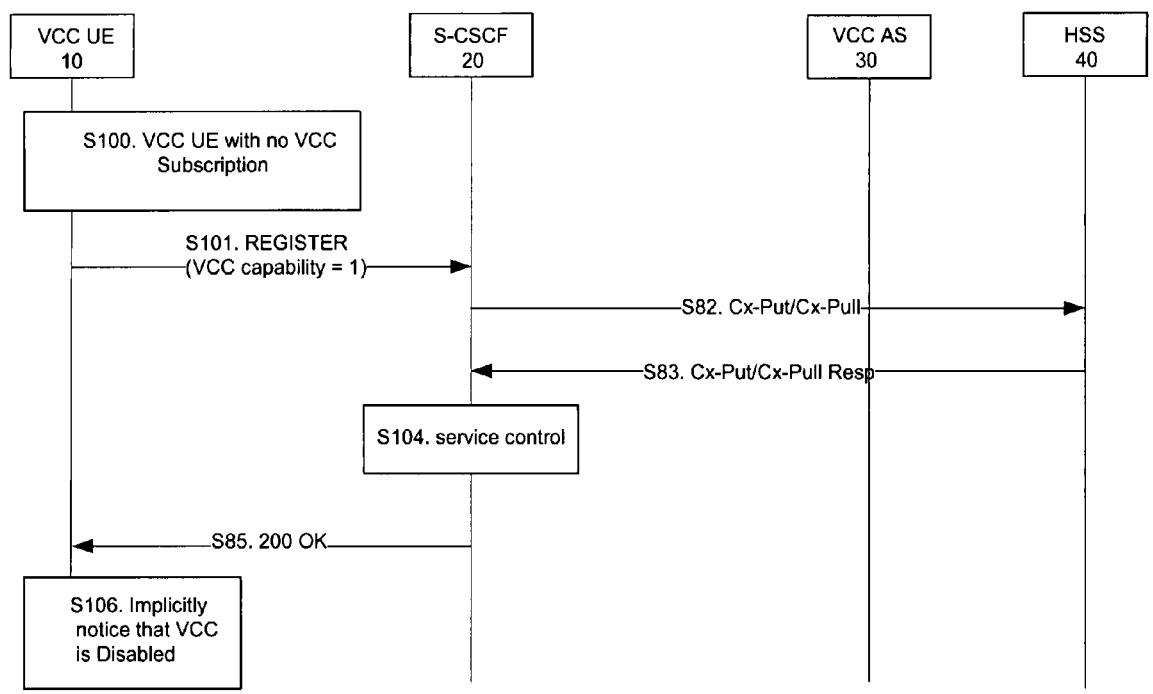
FIG. 8 is a flowchart illustrating a procedure in which a terminal registers in a VCC AS in a case where the terminal is a VCC UE and the terminal user has no VCC subscription according to an embodiment of the present invention.

FIG. 8 is a flowchart illustrating a procedure in which a terminal registers in a VCC AS in a case where the terminal is a VCC UE and a user has no VCC subscription according to an embodiment of the present invention.

The method of FIG. 8 according to the present invention can be applied to the following case. In a case where the user of the VCC UE 10 uses a VCC capable terminal but has no VCC subscription, the VCC UE 10 determines to be capable of using the VCC functions and then performs the VCC related functions (e.g., domain transfer, domain selection, etc.) conventionally. That is, conventionally, since there is no way for the VCC UE 10 to know whether or not the user of the UE has the VCC subscription, the VCC UE 10 does not know that the current user has no VCC subscription and still performs or attempts to perform the VCC related operations. However, if the user has no VCC subscription, the VCC UE 10 is not required to (and preferably should not) perform or initiate the VCC related operations. Performing the VCC related operations only disadvantageously causes a waste of resources. To address this limitation associated with the related art, the method of FIG. 8 illustrates that the VCC UE 10 checks whether the user has the VCC subscription and accordingly enables or disables the VCC function.

As illustrated in FIG. 8, a user of the VCC UE 10 with no VCC subscription tries to register in the VCC AS 30 using his VCC UE 10 (S100). That is, the VCC UE 10 sends a SIP-based REGISTER message to the S-CSCF 20, intended for the VCC AS 30, to start the registration procedure (S101). The REGISTER message includes VCC capability information indicating that the UE 10 is a VCC capable UE (i.e., the terminal has the VCC capability0. For instance, a 'VCC Capability' parameter set to '1' as shown in FIG. 8 is inserted in a body (or header) of the REGISTER message as one feature tag, as illustrated in FIG. 9.

Steps S102 and S103 in FIG. 8 of requesting, by the S-CSCF 20, the subscriber information of the user from the HSS 40 are the same as steps S32 and S33 in FIG. 3. Therefore, the explanation for steps S102 and S103 can be understood by referring to the explanation of steps S32 and S33 of FIG. 3.

The S-CSCF 20 stores a User Profile (subscription information) received from the HSS 40 through steps S102 and S103, and performs a service logic depending on the iFC included in the User Profile (S104). As a result, the S-CSCF 20 recognizes that the user of the VCC UE 10 has no VCC subscription. Therefore, the S-CSCF 20 does not perform the third party registration (VCC service registration) toward the VCC AS 30, but rather sends a response message (e.g., 200 OK message) with respect to step S101 to the UE 10 (S105). Here, although the VCC service registration is not performed, an IMS registration or other type of registration may be possible.

The response message (i.e., 200 OK message) in step S105 does not include the 'VCC Capability' parameter. That is, according to one example, the S-CSCF 20 does not include the 'VCC Capability' parameter in the response message on purpose, so as to inform the UE 10 that the user of the UE 10 has no VCC subscription and the VCC operations have been disabled.

When the VCC UE 10 receives the response message (i.e., 200 OK message) from the S-CSCF 20 at step S106, the VCC UE 10 analyzes the response message (i.e., 200 OK message) and checks for the non-existence of the 'VCC Capability' parameter, and if the response message does not include the 'VCC Capability' parameter, the VCC UE 10 may thusly recognize implicitly that the user of the VCC UE 10 has no active VCC subscription and thus the VCC has been disabled. According to this condition, the VCC UE 10 can be aware that the registration procedure for the VCC service has not been performed, and also be aware that the user of the VCC UE 10 currently has no VCC subscription. Thus, the VCC UE 10 may not perform (or initiate) VCC related operations. For instance, the VCC UE 10 may not perform operations related to the domain transfer (e.g., monitoring other radio accesses, the corresponding registration procedure, resources allocation, etc.), even if the voice service is being provided over the CS or IMS domain.

Figure 10:
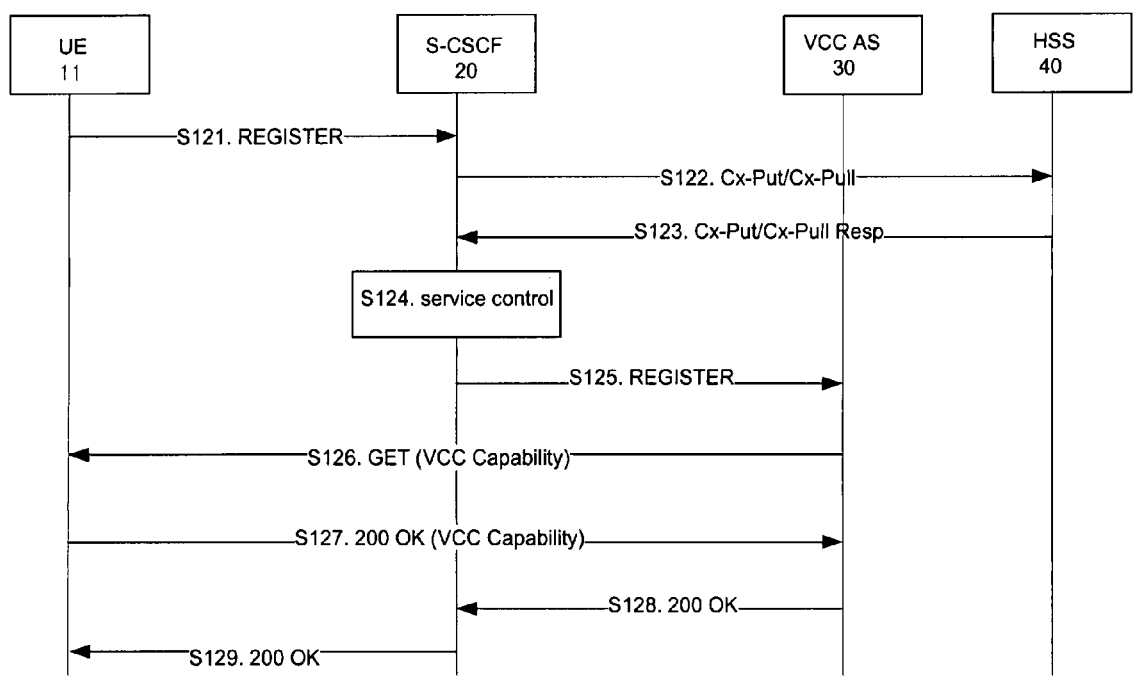
FIG. 10 is a flowchart of a procedure in which a terminal registers in a VCC AS in a case where the terminal is a VCC non-capable UE and the terminal user has a VCC subscription according to the present invention.

FIG. 10 is a flowchart illustrating a procedure in which a terminal registers in a VCC AS in a case where the terminal is a VCC non-capable UE and a user of the terminal has a VCC subscription, according to an embodiment of the present invention.

The method of FIG. 10 can be applied to a case where the user has the VCC subscription but uses a VCC non-capable UE 11 (i.e., the terminal does not have the VCC capability). In this case, since the VCC user has the VCC subscription, the S-CSCF 20 can perform the third party registration procedure for the VCC. However, because the UE 11 is a VCC non-capable UE, the network does not need to perform the VCC related operations (e.g., domain transfer, domain selection, exchange of operator policies, etc.) with the UE 11, similar to the case where the VCC function is disabled. Since the UE 11 is a VCC non-capable UE, the initiation of the VCC related operations is useless and thus not desired. Thus, the present invention provides a method of communicating the non-capability of the UE to the VCC AS in FIG. 10.

According to the embodiment of FIG. 10, the VCC AS 30 can recognize whether the UE 11 is a VCC UE or a VCC non-capable UE depending on the existence or non-existence of a 'VCC Capability' feature tag in the REGISTER message. However, even if the 'VCC Capability' feature tag is not included in the REGISTER message received by the VCC AS 30, a process of querying this information indicating whether or not the UE 11 is a VCC UE via the V3 interface (also referred to as a query process) is performed. This query process is performed for compatibility with an existing VCC terminal with no VCC function. Steps S126 and S127 in FIG. 10 correspond to the query process by the VCC AS 30.

More specifically, as illustrated in FIG. 10, the user having the VCC subscription uses the UE 11 (i.e., the VCC non-capable UE) to try to perform the registration to the IMS domain. Accordingly, the UE 11 sends the SIP-based REGISTER message to the S-CSCF 20 (S121). Here, the REGISTER message does not include the 'VCC Capability' feature tag (or indicator) indicating the no VCC capability of the UE 11. This is because the UE 11 is a VCC non-capable UE, i.e., the UE 11 is not capable of employing or supporting the VCC. The UE 11, in step S121, starts the registration procedure to the IMS domain through the REGISTER message. The REGISTER message is delivered to the S-CSCF 10 according to normal (appropriate) processes.

The S-CSCF 20 then sends to the HSS 40 its own information and the user's specific information through an existing registration procedure in order to process the received REGISTER message, thereby requesting the UE user's subscription information (S122). The HSS 40 then sends a User Profile through a response message in response to this request (S123). That is, steps S122 and S123 are the same as steps S32 and S33 in FIG. 3. Therefore, the explanation for steps S122 and S123 can be understood by referring to the explanation of steps S32 and S33 of FIG. 3.

The User Profile for the user of the UE 11, which the S-CSCF 20 has obtained through steps S122 and S123 may include an iFC which includes the user's service subscription information, or the like. Here, it is assumed that the user of the UE 11 has the VCC subscription, and thus the iFC includes contents (or information) related to the VCC service. Here, the contents related to the VCC service of the iFC denote contents which are to be delivered to the VCC AS 30 after receiving a session for the VCC from the VCC subscriber (i.e., the user of the current UE 11).

The S-CSCF 20 then stores the User Profile received from the HSS 40 and performs a service logic depending on the received iFC (S124). Accordingly, because the user of the UE 11 has the VCC subscription, the S-CSCF 20 performs the third registration procedure toward the VCC AS 30. That is, the S-CSCF 20 sends to the VCC AS 30 the REGISTER message to perform the third registration (S125). Here, the REGISTER message does not include any VCC capability information since such information is not available to the S-CSCFR 20.

After receiving the REGISTER message, the VCC AS 30 then analyzes the received REGISTER message to check for the existence or non-existence of the VCC capability information such as 'VCC Capability' feature tag in the REGISTER message. However, if the VCC AS 30 determines that the 'VCC Capability' feature tag is not included in the REGISTER message, then this may indicate two possible cases. In the first case, it may indicate that the 'VCC Capability' feature tag is not included in the REGISTER message because the UE 11 is a VCC capable UE (i.e., VCC UE) but does not support the 'VCC capability' feature tag. In the second case, it may indicate that the 'VCC Capability' feature tag is not included therein because the UE 11 is a VCC non-capable UE. In order to distinguish between the two cases, the VCC AS 30 performs the query process of checking whether the UE 11 is a VCC UE or a VCC non-capable UE (S126 and S127). Steps S126 and S127 are preferably performed through the V3 interface between the UE 11 and the VCC AS 30 (i.e., directly), but can be performed through other means.

Particularly, the VCC AS 30 sends to the UE 11, through the V3 interface, a message for querying whether the UE 11 is a VCC capable terminal (i.e., VCC UE) by use of a HTTP command word 'GET' (here, the message is represented as 'GET (VCC Capability) message in FIG. 10) (S126). One example of such a HTTP GET message for querying the 'VCC Capability' feature tag is shown in FIG. 11.

After receiving the 'GET (VCC Capability)' message, the UE 11 sends to the VCC AS 30 a response message including the requested 'VCC Capability' feature tag (for example, VCC Capability=0) in response to the 'GET (VCC Capability)' message (S127). Since the UE 11 is not a VCC UE, the 'VCC Capability' parameter set to '0' is sent to the VCC AS 30 by being included, as a feature tag, in the response message (e.g., 200 OK message). One example of such '200 OK message' is shown in FIG. 12. In the example of FIG. 10, even though the user of the UE 11 has the VCC subscription, if the VCC AS 30 recognizes, through steps 126 and S127, that the 'VCC Capability' feature tag within the response message (i.e., 200 OK message) of step S127 is set to '0', or if the VCC AS 30 has unsuccessfully received the response message (or has not received the response message within a set time period), then the VCC AS 30 determines that the UE 11 is a VCC non-capable UE. Since the VCC AS 30 determines that the UE 11 does not have the VCC capability, it determines that it is not required to (or should not) perform the VCC related operation and does not perform or initiate any VCC related operation, thereby preventing any waste of resources.

Furthermore, the VCC AS 30 sends a response message (e.g., 200 OK message) to the S-CSCF 20 in response to the REGISTER message of step S125 (S128), indicating that the IMS registration is performed. The S-CSCF 20 then sends the response message to the UE 11 (S129).

Hereinafter, operations and construction of a UE and a VCC Application Server (VCC AS) according to the present invention will be explained.

Figure 13:
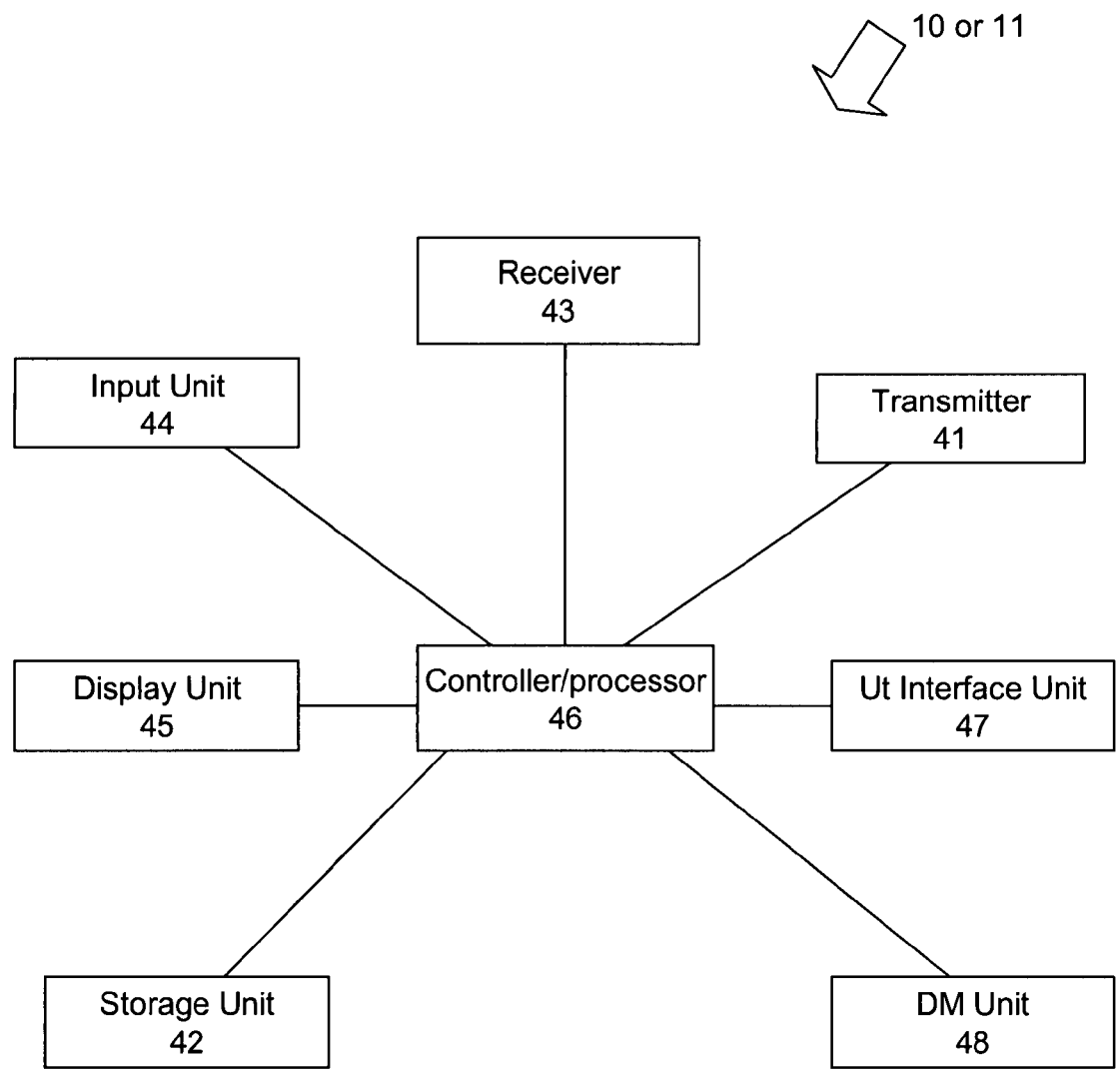
FIG. 13 is a block diagram of an example of a terminal (UE) according to the present invention.

A terminal (i.e., UE) according to the present invention may include hardware and software constructions needed to send the VCC related information (e.g., VCC capability information, VCC enabling information, etc.) to the VCC AS by use of the REGISTER message or a dedicated message (e.g., a message or data delivered through the V3 interface), and to process the response message with respect to the sent message. FIG. 13 illustrates a block diagram of a terminal (UE) according to the present invention. As shown in FIG. 13, the terminal 10 or 11 according to the present invention may include a transmitter 41 for sending data and messages such as a REGISTER message which can include VCC capability information and/or VCC enabling information; a receiver 43 for receiving data and messages such as a query message (e.g., GET (VCC Capability)) related to the VCC function, which can be sent through a dedicated interface (e.g., V3 interface) and for receiving a response message with respect to the REGISTER message, a memory or storage unit 42 for storing user preferences, VCC capability information, VCC enabling information, and other information; an input unit 44 for receiving a user's input such as a user's preference to change the enabling status of the VCC function to the disabling status or vice versa; a display unit 45 for displaying information, menus, etc., and a controller/processor 46 for controlling these components. The terminal may also include other components such as a Ut interface unit 47, a DM unit 48, etc. Also, the controller 46 can control and/or carry out the methods discussed above in connection with FIGS. 3 to 12, with the VCC AS, S-CSCF, etc. according to the present invention.

As described above, operations and functions of each component of the UE which includes the technical features of the present invention have been described. However, it is obvious to those skilled in the art that other known components of the terminal may be needed to receive VCC services, explanation of which will be omitted.

Also, a VCC Application Server (VCC AS) according to the present invention may include a receiver for receiving from the terminal a REGISTER message including VCC function status information such as VCC capability information and/or VCC enabling information, a determining unit for determining whether not the terminal is a VCC capable terminal and whether the VCC function of the terminal is enabled or disabled by analyzing the VCC related information included in the REGISTER message received, and a VCC enabler for performing or not performing VCC related operations with respect to the terminal according to the determination. Also, the receiver may also send a response message to the terminal in response to the REGISTER message. However, the determining unit may be implemented as a type of controller.

As described so far, in the present invention, since the terminal (i.e., UE) sends the VCC function status information including the VCC capability information and/or VCC enabling information to the network server (e.g., VCC AS), useless VCC related operations (e.g., domain transfers, etc.) are not required to be performed between the terminal and the network server. In addition, useless VCC related operations can be prevented from being unnecessarily performed between the terminal and the network server, thereby preventing a waste of resources.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method for controlling a voice call continuity (VCC) function of a terminal in a mobile communications system performing VCC related functions, the method comprising:
receiving, by a first network server, VCC capability information of the terminal from the terminal, the VCC capability information indicating whether the terminal is a VCC capable terminal;
obtaining, by the first network server, subscriber information associated with the terminal;
determining, by the first network server, whether or not a user of the terminal is a VCC subscriber based on the obtained subscriber information;
transmitting, by the first network server, the VCC capability information to a second network server, if the determining step indicates that the user of the terminal is a VCC subscriber;
performing, by the second network server, a VCC function control for the terminal based on the VCC capability information if the determining step indicates that the user of the terminal is a VCC subscriber, wherein the step of performing the VCC function control includes updating a VCC active user list based on the VCC capability information;
transmitting, by the terminal, VCC enabling information to the second network server, the VCC enabling information indicating whether the VCC function of the terminal has been enabled or disabled before or after the terminal is registered with the second network server; and
selectively removing a user of the terminal from the VCC active user list based on the VCC enabling information.

2. The method of claim 1, wherein the VCC function control includes updating a VCC active user list based on the VCC capability information.

3. The method of claim 2, wherein the VCC function control further includes selectively providing at least one VCC operation to the terminal based on the updated VCC active user list.

4. The method of claim 3, wherein the at least one VCC operation includes at least one of a domain transfer operation and a domain selection operation.

5. The method of claim 1, wherein the first and second network servers are respectively a S-CSCF (serving call session control function) and a VCC application server.

6. The method of claim 1, wherein the VCC capability information is transmitted through a SIP (session initiation protocol)-based register message.

7. The method of claim 1, further comprising:
transmitting a response message including the VCC capability information from the second network server to the terminal through the first network server, after the performing step.

8. The method of claim 1, wherein the VCC enabling information is transmitted from the terminal to the second network server through a V3 interface.

9. The method of claim 1, wherein if the determining step indicates that the user of the terminal is not a VCC subscriber, then the method further comprises transmitting a response message to the terminal.

10. The method of claim 9, wherein if the determining step determines that the user of the terminal is not a VCC subscriber, the response message excludes the VCC capability information and indicates that the VCC function is disabled.

* * * * *